Figure 1:
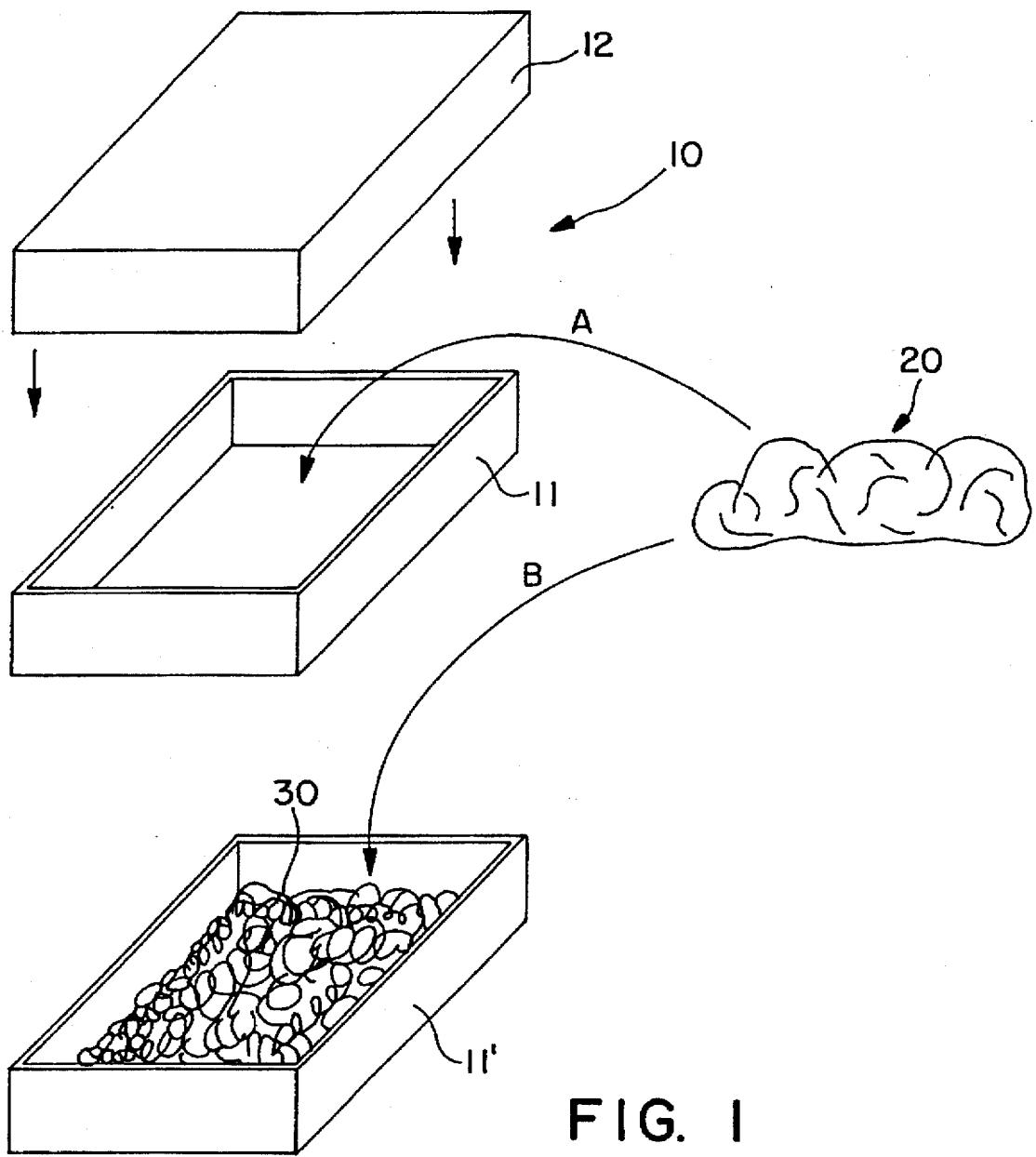

United States Patent [19]

Lopuszanski et al.

[11] Patent Number: 5,664,366
[45] Date of Patent: Sep. 9, 1997

[54] SHIPPING CONTAINER FOR SEA WORMS

[76] Inventors: Michel Lopuszanski, 24, rue de la Lisiere-F-14123, Cormelle le Royal; Daniel Lopuszanski, 9, avenue Don Camillo, 13620 Carry le Rouet, both of France

[21] Appl. No.: 228,074

[22] Filed: Apr. 15, 1994

[30] Foreign Application Priority Data

Apr. 21, 1993 [FR] France ................... 93 04916
Aug. 13, 1993 [FR] France ................... 93 10098

[51] Int. Cl.$^6$ ................................ A01K 97/04
[52] U.S. Cl. ............................. 43/55; 117/6.7
[58] Field of Search ....................... 43/55; 119/6.7

[56] References Cited

U.S. PATENT DOCUMENTS

| | | | |
|---|---|---|---|
| 2,790,716 | 4/1957 | Buss | 43/55 |
| 2,809,463 | 10/1957 | Buss | 43/55 |
| 3,517,456 | 6/1970 | Croes | 43/55 |
| 4,172,333 | 10/1979 | Aylor | 43/55 |
| 5,085,000 | 2/1992 | Ford | 43/55 |

FOREIGN PATENT DOCUMENTS

| | | |
|---|---|---|
| 1338944 | 3/1963 | France . |
| 2399801 | 3/1979 | France . |
| 2240456 | 8/1991 | United Kingdom . |

*Primary Examiner*—Jeanne Elpel
*Attorney, Agent, or Firm*—Laff, Whitesel, Conte & Saret, Ltd.

[57] ABSTRACT

A shipping container for sea worms contains a fibrous bed of vegetable matter which is degraded by fermentation. The bed is both wetted and seeded with a microorganism in order to insure the fermentation.

3 Claims, 1 Drawing Sheet

SHIPPING CONTAINER FOR SEA WORMS

The present invention relates to a container for the conditioning of sea (fishing) worms and to a process for the packaging of sea worms.

Sea worms generally are packaged in small containers of varied shapes made up of at least one envelope that may be a box or a pot, covered or not with a lid, or also a bag. The materials used for these containers generally are plastic material, cardboard or others, associated among themselves or not.

Inside this envelope, there is generally placed a moist support meant to supply to the living worms the moisture they need. The generally used supports for the packaging of fishing worms are algae, grasses, sand, soil, peat, mud or any other mineral material, etc.

The purpose of the present invention is to propose a container in which the support used is economical, easily available, but also easy to use, and that appreciably improves the preservation and the presentation of the worms.

It has been found that a support that satisfies this purpose, and therefore that constitutes the object of the present invention essentially is a support having as its base vegetable cellulose, moistened and to which there is or is not added a complementary support, the whole having the property of being rapidly degraded through natural or induced fermentation.

This degradation under the action of enzymes and of bacteria transforms the cellulose fibers into a material highly nourishing for the worms and at the same time it creates a physico chemical environment advantageous for their survival. This phenomenon, so to speak, restores a true ecosystem for the sea worms.

The complementary support may be any product or material that helps preservation, by-products for example of the chemical or pharmaceutical industries. It may also be an element generally used as a support in the containers of the prior art, such as algae, grasses, sand, soil, peat, or any other mineral material. This may also be wood, sawdust, paper, mud, or others. It also may be a biological fermentation agent.

It will be noted that this complementary support may be separate from the support having as its base vegetable cellulose fibers, or it may be incorporated into the latter.

The medium having as its base vegetable cellulose fibers is, in a first mode of execution of the invention, made up of paper in the form of sheets of paper that have been moistened.

It may, in another mode of execution of the invention, be constituted by paper paste that may derive from various origins, such as wood, straw, rags, recycled paper, etc. It may be taken out at a more or less advanced stage of paper fabrication. This paper paste advantageously is moistened, preferably with more or less salted water, with sea water for example.

The complementary support is, among other things, used in the present invention as a bringer-in of germs for the degradation of the support's cellulose fibers by fermentation. Thus the support made up of degraded cellulose fibers, especially in the case when the same initially is constituted by paper, turns brown on its surface and blackish within its mass, and it forms a medium that, for sea worms, is close of their natural environment with respect to its physico chemical characteristics. Thus, the new product resulting from this constitutes a food for the worms.

It has been possible to observe a very appreciable increase in the preservation duration of the sea worms when a support according to the invention is used.

The complementary support also may be used as an additional food or other.

When the support is in the form of moistened sheets of paper, the worms will crawl into the folds of the paper that more or less form galleries or tunnels, further reminding them of their natural habitat.

The worms placed into a container that contains a support of paper paste are going to crawl throughout the paste and form more or less regular galleries that are reminiscent of their natural habitat. Besides, the paper paste, in its appearance, its texture and its consistence comes close to the mud that forms the natural environment of the worms. It is, however, cleaner and lighter than mud and it has an appearance making for a better presentation and a greater facility of use. Moreover, its color is such that it brings out the color of the worms.

It will be noted that the support may undergo a degradation by fermentation either prior being put into the container, or when inside the container, in the very presence of the worms.

When that degradation takes place beforehand, same may be caused by moistening in the absence of oxygen, with or without any fermentation agent, such as ammonium sulfate.

The present invention also relates to a process for the preservation of sea worms inside a container essentially made up of an envelope. According to this process, there is used a support the base of which is vegetable cellulose, to which there is added a complementary support, on which, when it is put into the envelope, the above-mentioned worms are placed.

The support is made up of moistened sheets of paper, or of paper paste.

Advantageously, said support is caused to undergo a degradation by fermentation prior to its being placed into the envelope.

The characteristics of the invention indicated above, as well as others, will appear more clearly upon reading of the following description of one example of execution. The attached drawing that shows one mode of execution or example of a container according to the invention.

In the single figure, there is seen a box 10, made up of a bottom part 11 and of a lid 12, the bottom part 11 and the lid 12 may be formed of plastic material, for example. There is provided for an ventilation device, placed either in the lid or in the bottom part. There is also seen a support 20 for the worms made up of a clump having as its base vegetable cellulose fibers which have already been caused to ferment, or not, such as paper in the form of moistened paper sheets or of paper paste.

This clump 20 is meant to be placed and spread over the bottom 11 of box 10 (arrow A). It may also be placed into the bottom part of a box 10 that already has a complementary support 30 in its bottom part 11 (arrow B).

It will be noted that the complementary support (30) may be placed after the clump 20, or that it may even be incorporated into support 20.

The box 10 forms an envelope that is closed by its lid 12, said envelope being meant to receive support 20 or the supports 20 and 30.

The invention also applies to any container made up of at least one envelope. Thus it applies in the case of a container that takes the shape of a bag or of a pot covered or not with a lid. It also applies to the case of boxes made up of several elements in their bottom part and in their lid part.

In addition to the above-indicated advantages, paper is light, therefore economical for transportation. It is also very easy to use for the packaging.

We claim:

1. A process for preservation of sea worms, said process comprising the steps of:

providing a container in the form of an envelope (10), providing a support (20) comprised of a base of vegetable cellulose fibers that degrade by fermentation, moistening said cellulose fibers, adding a complementary support (30) to said support (20), having microorganisms in said complementary support (30) for causing a degradation by fermentation of said support (20), placing the worms on said complementary support (30) after it is placed in said envelope (10), adding moisture in the absence of oxygen onto said support (20) to cause it to be degraded by fermentation prior to its being put into said envelope (10), and adding a fermentation agent to said support (20) prior to its being put into said envelope (10), said fermentation agent comprising ammonium sulfate.

2. A process for preservation of sea worms according to claim 1, wherein said support (20) is made of moistened sheets of paper.

3. A process for preservation of sea worms according to claim 1, wherein said support (20) is made of paper paste.

* * * * *